(12) United States Patent
Martinez et al.

(10) Patent No.: US 7,049,808 B2
(45) Date of Patent: May 23, 2006

(54) APPARATUS FOR SENSING ANGULAR POSITION

(75) Inventors: Daniel A. Martinez, El Paso, TX (US); Arquimedes Godoy, Chihuahua (MX); Jose L Almaraz, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/792,487

(22) Filed: Mar. 3, 2004

(65) Prior Publication Data

US 2005/0194966 A1    Sep. 8, 2005

(51) Int. Cl.
*G01B 7/30*    (2006.01)
(52) U.S. Cl. .................................. 324/207.25
(58) Field of Classification Search ..............................
324/207.11–207.13, 207.2, 207.21–207.25,
324/173–174, 244, 251, 259–260; 73/493–494,
73/514.16, 514.31
See application file for complete search history.

(56) References Cited

U.S. PATENT DOCUMENTS

| | | | |
|---|---|---|---|
| 5,159,268 A | 10/1992 | Wu et al. | |
| 5,208,532 A | 5/1993 | Alfors | 324/207.2 |
| 6,104,269 A | 8/2000 | Chitayat | |
| 6,340,884 B1 * | 1/2002 | Wolf et al. | 324/207.21 |
| 6,433,536 B1 | 8/2002 | Yundt et al. | |
| 6,509,734 B1 | 1/2003 | Luetzow | |
| 6,518,750 B1 | 2/2003 | Lin et al. | |
| 6,534,971 B1 | 3/2003 | Braun et al. | |
| 6,566,860 B1 | 5/2003 | Lin et al. | |
| 6,576,890 B1 | 6/2003 | Lin et al. | |
| 6,777,928 B1 * | 8/2004 | Ramirez | 324/207.25 |
| 2005/0127900 A1 * | 6/2005 | Johnson et al. | 324/207.2 |

OTHER PUBLICATIONS

European Search Report dated Jun. 23, 2005.

* cited by examiner

*Primary Examiner*—Bot LeDynh
(74) *Attorney, Agent, or Firm*—Jimmy L. Funke

(57) ABSTRACT

An apparatus for sensing a position of an object is provided that may include a magnet having a set of magnetic flux properties, the magnet mounted for movement about an axis relative to the object and a magnetic field-sensing device mounted in fixed relation to and spaced from the magnet, the magnetic field-sensing device calibrated to sense a change in at least one magnetic flux property in response to movement of the magnet relative to the object and generate a data signal indicative of a position of the object. In one aspect the magnet is configured to have a substantially diamond shaped cross section and the magnetic field-sensing device is calibrated to sense a change in flux density distribution in response to a change in an air gap defined between an exterior surface of the magnet and the magnetic field-sensing device.

8 Claims, 5 Drawing Sheets

APPARATUS FOR SENSING ANGULAR POSITION

CROSS REFERENCE TO RELATED APPLICATIONS

This application is related to a U.S. patent application filed on even date herewith having application Ser. No. 10/792,488 filed on 3 Mar. 2004, which is specifically incorporated herein by reference.

FIELD OF THE INVENTION

The present invention relates in general to angular position sensors and in particular to a sensor using a magnet shaped for reducing nonlinearity.

BACKGROUND OF THE INVENTION

Some motor vehicle control systems require angular position sensors that need only sense partial angular motion of one part relative to another part, e.g., less than plus or minus ninety degrees. Shaped magnets have been used in conjunction with magnetic field sensors in order to provide non-contact angular position sensors that sense partial angular motion. Angular position sensors utilizing rotating magnets sensed by stationary magnet field sensors typically produce a sinusoidal or pseudo-sinusoidal output signal. These signals may somewhat approximate a linear output signal at least over some limited angular range. Also, resistance-strip position sensors have been widely used to determine the position of a moving part relative to a corresponding stationary part. Such sensors can have reliability problems due to the susceptibility of the resistance-strips to premature wear. Also, the vibration of contact brushes along the resistance-strips may cause unacceptable electrical noise in the output signals.

Current magnetic, rotary position sensors, such as a Hall-effect type sensor utilize a wide variety of magnetic configurations to achieve the required characteristics of the raw magnetic signal. Most configurations employed minimize or avoid the non-linear effect caused by free-space, or air, on the flux distribution, i.e., magnitude and direction, surrounding the magnetic source. One way of minimizing or avoiding this undesired effect is by utilizing magnetic flux concentrators that direct flux lines to desired locations. Depending on the application, these concentrators may be of common ferromagnetic material or may require the use of other material, such as Silicon-Iron, to achieve desired characteristics such as low hysterisis, for example. The number of flux concentrator pieces may double if the application requires sensor redundancy.

When flux concentrators are not used, the geometrical shapes of the magnetic sources may become complex. Also, the geometrical shapes of the concentrators themselves are often complex. As with any other component, geometrical complexity increases the cost associated to produce such component and obviously drives the total component and manufacturing costs of the respective sensor assembly. Those sensors utilizing concentrators and requiring low hysterisis are typically the most expensive because of the special material required. Typically, the wider the application ranges of rotation, the higher the cost of the sensor system.

BRIEF SUMMARY OF THE INVENTION

Magnetic, rotary position sensors typically require some degree of magnetic linearity within the range of motion of their application. Linear Hall-effect packaging technology offers the added advantage of calibration. With calibration, the linear response of the sensor may be further improved where the level of improvement depends on the Hall device being used. However, the raw magnetic flux signal generated by the sensor's magnetic circuit needs to posses certain characteristics or "lend" itself to be further improved. In other words, a certain level of linearity needs to be exhibited by the raw signal.

Aspects of the invention employ a cost effective magnetic configuration that may include only one magnet. Sensor redundancy may easily be achieved without the need of additional magnetic flux producing or flux carrying components such as magnets or concentrators since the raw magnetic signal has symmetry. This symmetry allows the use of a Hall-device on either side of the magnet.

An apparatus for sensing a position of an object is provided that may include a magnet having a set of magnetic flux properties, the magnet mounted for movement about an axis relative to the object and a magnetic field-sensing device mounted in fixed relation to and spaced from the magnet, the magnetic field-sensing device calibrated to sense a change in at least one magnetic flux property in response to movement of the magnet relative to the object and generate a data signal indicative of a position of the object. In one aspect the magnet is configured to have a substantially diamond shaped cross section and the magnetic field-sensing device is calibrated to sense a change in flux density distribution in response to a change in an air gap defined between an exterior surface of the magnet and the magnetic field-sensing device.

BRIEF DESCRIPTION OF THE DRAWINGS

The invention will be more apparent from the following description in view of the drawings that show.

DETAILED DESCRIPTION OF THE INVENTION

Figure 1:
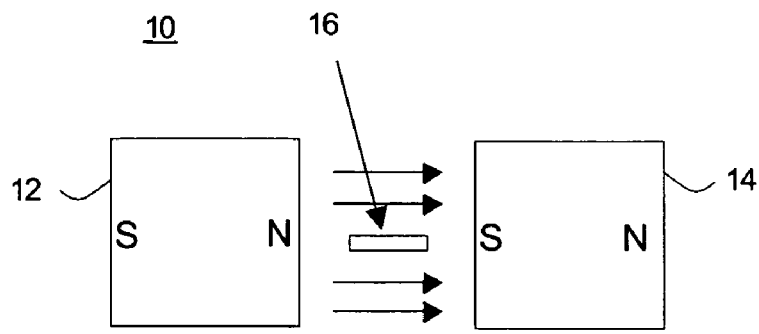
FIG. 1 illustrates a representation of a prior art sensing device.

FIG. 1 illustrates a prior art sensing device 10 that uses a dual magnet array. Device 10 includes a first magnet 12 and a second magnet 14 that create a magnetic field that changes as the magnets are rotated about a sensing element 16. Sensing element 16 is positioned between two magnets 12, 14 and may detect the amount of flux lines crossing perpendicular to the sensing element 16. The field distribution detected by sensing element 16 may yield a response that somewhat approximates a linear response. However, it has been determined that by using a single magnet, shaping it to a specific geometry and determining certain other sensor system design parameters as a function of the magnet's shape, a more linear output from a sensing element may be obtained than the sensing device 10 of FIG. 1.

Figure 2:
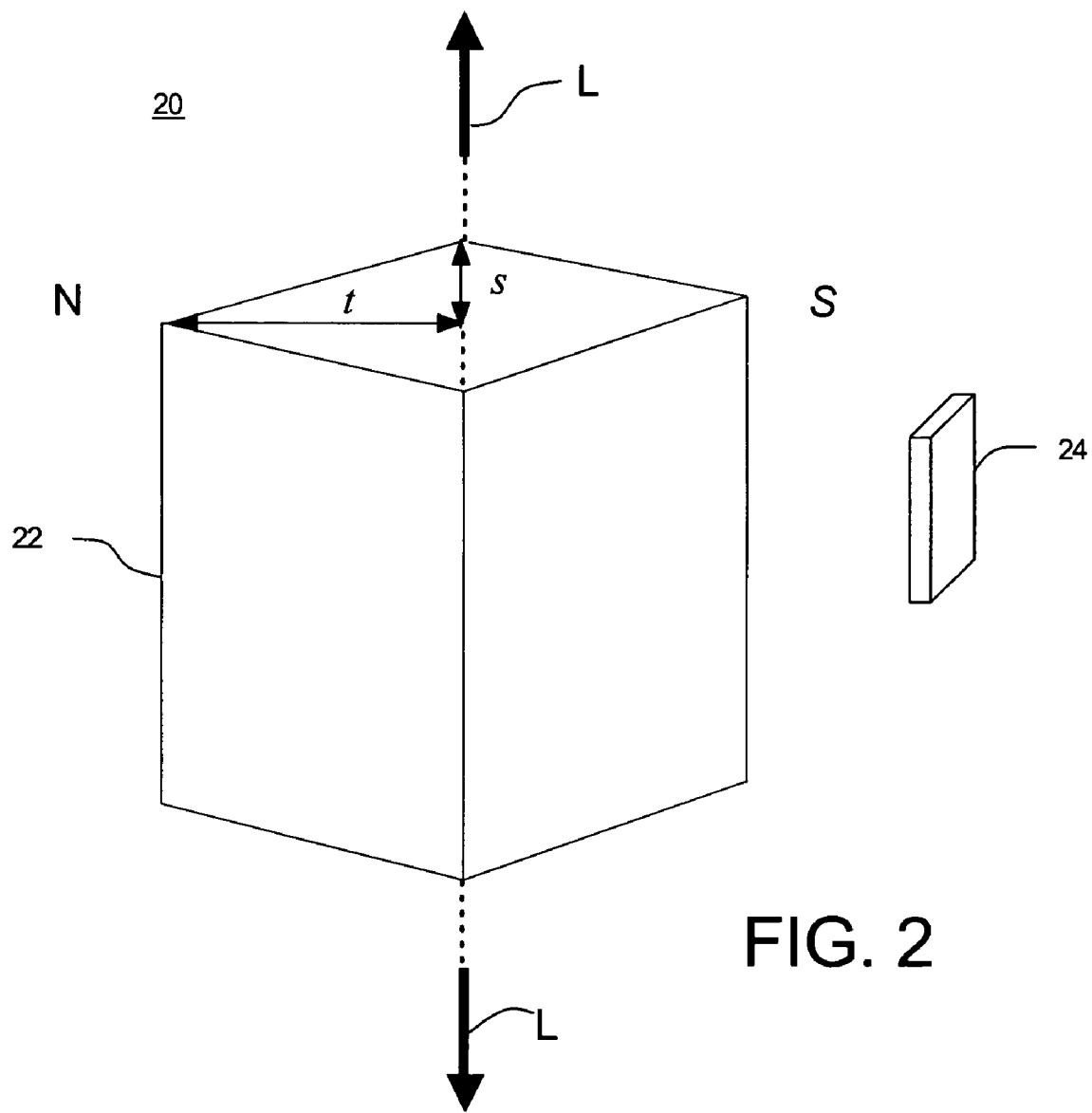
FIG. 2 illustrates a schematic perspective view of an exemplary embodiment of a sensor system in accordance with aspects of the invention.

FIG. 2 illustrates a schematic of an exemplary embodiment of a sensor system 20 in accordance with aspects of the invention. One aspect allows for sensor system 20 to include an exemplary magnet 22 configured substantially in the shape of rhombus, for example, such as a magnet having a diamond shaped cross section. In one aspect of the invention, the magnet's size and shape, or axial ratio, either alone or with respect to other combinations of design parameters of sensor system 20 may be determined through a series of magneto-static simulations. Such simulations may utilize any of the known numerical techniques, such as the finite element method or method of weighted residuals for example, that directly solve Maxwell's Equations. Such a magneto-static simulation is well understood by those skilled in the art and lends itself very well to utilizing both robust engineering techniques and simulation to achieve an optimum and robust design. Determining an optimum design in terms of linearity through simulation may provide a solid foundation but may not necessarily be the most robust design relative to practical physical constraints, for example, such as those resulting from variations in manufacturing or assembly of a sensor system 20. In this respect, an engineering decision may be made, based on the operating environment for the sensor system 20, regarding the range of acceptable limits of sensor system 20 design parameters. It will be appreciated that alternate embodiments may use varying geometric shapes for the magnet.

When shaping such magnets, one objective may be to achieve a linearly decreasing or increasing, depending on the direction of rotation of the magnet, flux density as observed by a field-sensing device 24. When designing such magnetic schemes for an embodiment of sensor system 20, one aspect allows for using design or sensor system parameters such as the field component being sensed by device 24, the total magnet-to-sensing device air gap 26 and the vector direction of the magnet's flux lines at the face of sensing device 24. Inventors of the present invention have determined that using these sensor system 20 parameters allows for determining a magnet's shape for reducing nonlinearities in embodiments of the invention. In an embodiment, as the diamond shaped magnet 22 rotates about an axis, the combined effect of air gap 26, the magnetic field component perpendicular to sensing device 24 and the flux line strength yield a flux density level that reduces nonlinearity. In this respect, the flux line strength is the strength of a flux line at any point in space and the flux density distribution is the amount of flux or flux lines, per unit area, passing through the sensing portion of sensing device 24. It will be appreciated by those skilled in the art that a field component parameter other than the field component perpendicular to sensing device 24, such as one parallel thereto, may be used depending on the sensing device being used.

In an embodiment, magnet 22 may be configured to rotate about a longitudinal axis "L", or the z-axis, as shown in FIG. 2, to yield a linear response relative to the angle of rotation. In one aspect, the shape of magnet 22 compensates for the nonlinear effect caused by air. For example, magnet 22 may be mechanically or otherwise mounted for rotation about axis L so it may rotate clockwise and/or counterclockwise.

Figure 3:
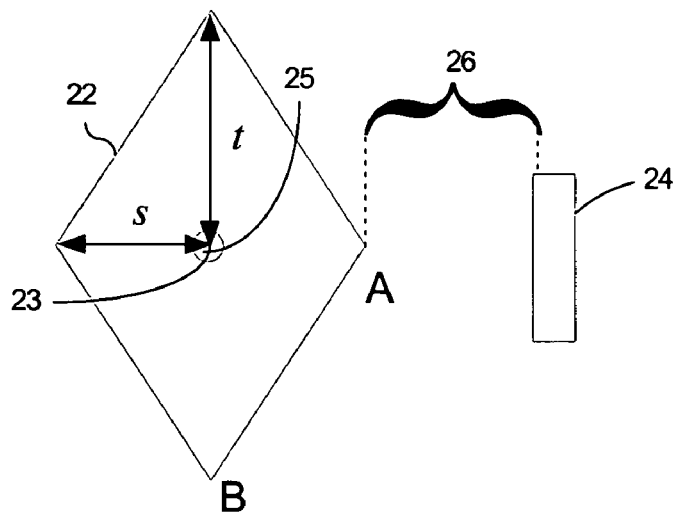
FIG. 3 illustrates a plan view of the exemplary embodiment of FIG. 2.
Figure 4:
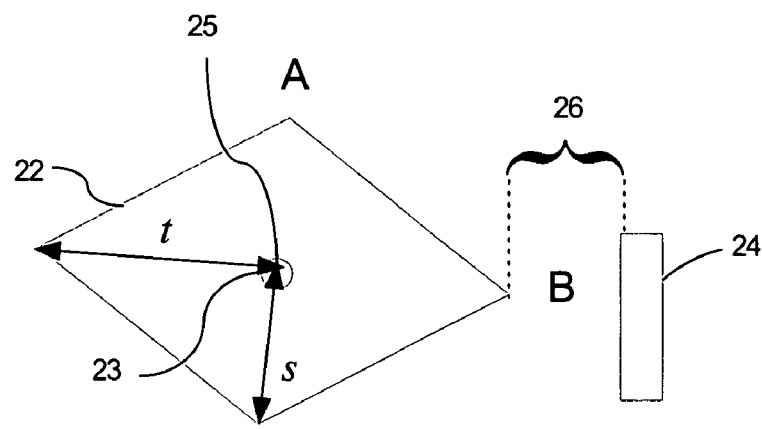
FIG. 4 illustrates a plan view of the exemplary embodiment of FIG. 3 rotated ninety degrees counter-clockwise.
Figure 5:
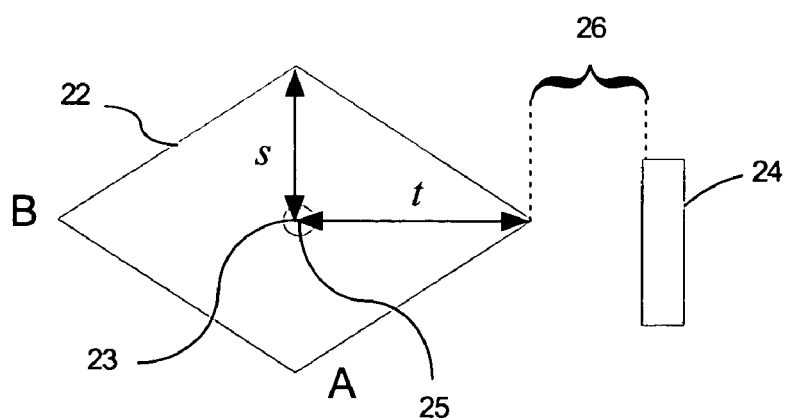
FIG. 5 illustrates a plan view of the exemplary embodiment of FIG. 3 rotated ninety degrees clockwise.

Magnetic field-sensing device 24 may be positioned a predetermined distance from magnet 22, such as from one of its corners, to define a gap or air gap 26 there between as more clearly shown in FIGS. 3–5. In an embodiment of the present invention, sensing device 24 may be a Hall-effect sensor for sensing amplitude of a perpendicular field component. More generally, sensing device 24 may be a galvanomagnetic type sensor, for example. Those skilled in the art will recognize alternate sensing devices that may be used in accordance with aspects of the invention such as those calibrated to sense a field component parallel to its sensing surface.

One aspect allows for sensing device 24 to remain stationary, i.e., in fixed relation with respect to magnet 22, while magnet 22 rotates about an axis, such as axis L. In this respect, sensing device 24 may be mounted to a platform or support plate (not shown) that may be appropriately positioned within a structure for which an angular position is to be determined using sensor system 20. For example, magnet 22 may be mechanically or otherwise mounted for rotation in relation to sensing device 24 to define air gap 26 and rotate within an angular range. In this respect, FIG. 3 illustrates an exemplary magnet 22 having a diamond shaped cross section mounted on a shaft 25 with "A" referencing a corner of magnet 22. Magnet 22 is positioned proximate sensing device 24 so that an air gap 26 is defined between reference corner "A" and a face of sensing device 24. FIG. 4 illustrates magnet 22 rotated approximately 90 degrees counterclockwise from the reference position of FIG. 3, which may be caused by an angular position change of an object when sensor system 20 is installed in relation to the object.

The general cross-sectional shape of magnet 22 may be defined in terms of design or sensor system 20 parameters "s" and "t", which may be varied for a particular design or application. It will be appreciated that dimensions "s" and "t" as shown may be extended to join their respective opposite vertices to define a first and a second diagonal dimension. In embodiments of the invention, the ratio of t/s may be approximately equal to 2.5/2.0 millimeters. Alternate embodiments may vary the value of this ratio as a function of sensor system 20 design parameters.

Figure 6:
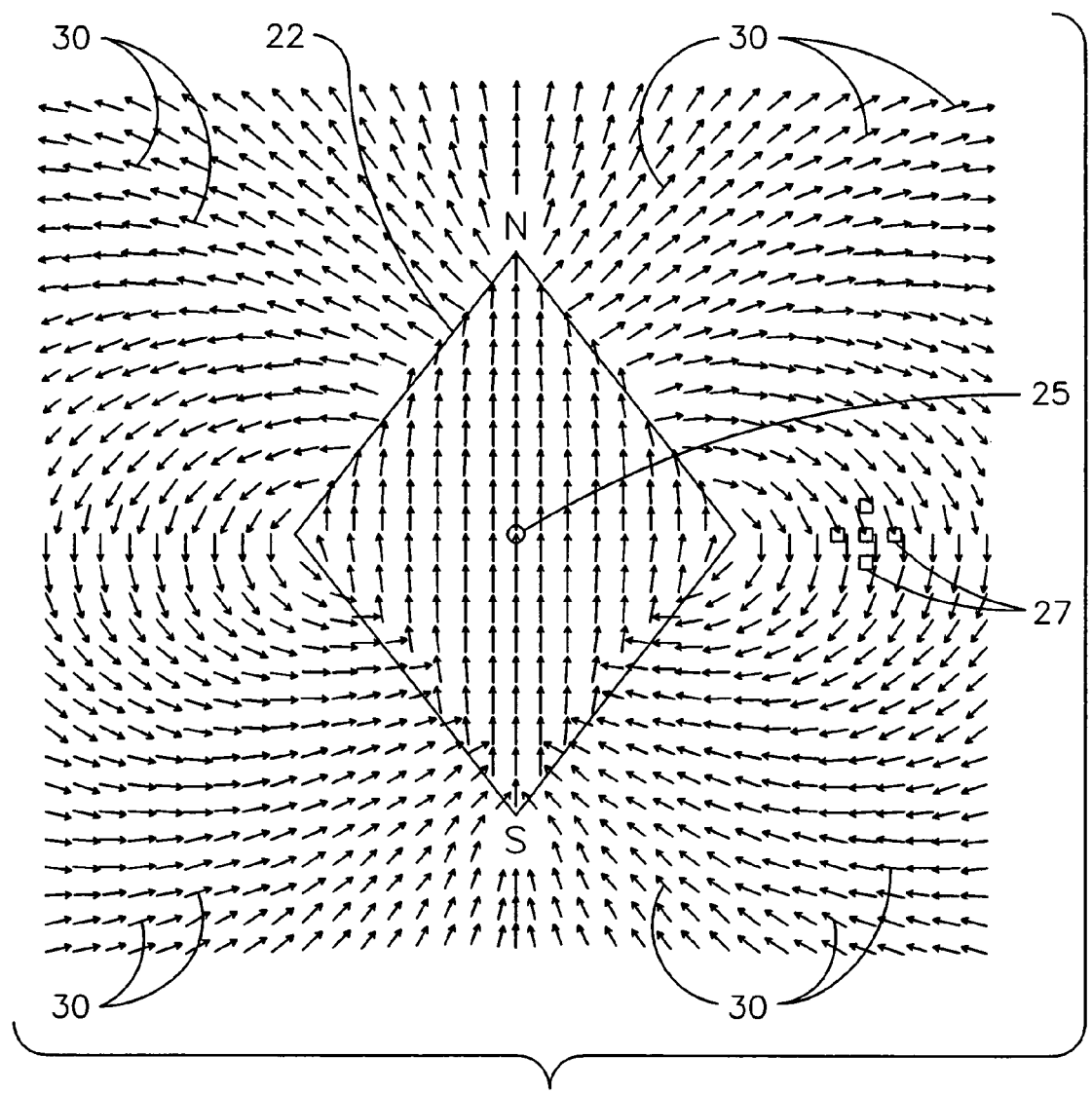
FIG. 6 illustrates exemplary flux lines of a magnet.

FIG. 6 illustrates generally the direction of flux lines 30 associated with an exemplary magnet 22 having a diamond shaped cross section. These flux lines 30 also apply to other figures illustrating magnet 22 but have been omitted for clarity. It will be appreciated by those skilled in the art that FIG. 6 is for illustration purposes and that the flux lines' 30 strength and direction will vary as a function of the properties of the magnet being used. In one aspect, assuming that dimension "t" is greater than dimension "s" may provide the optimum or most robust design for a given application. In this respect, air gap 26 defined between the sensing device 24 and reference point "A" shown in FIG. 3 will be greater than the air gap defined by sensing device 24 and reference point "B" shown in FIG. 4 (magnet 22 rotated 90 degrees counterclockwise). The combined effect of the distance defining air gap 26 with respect to reference points "A" and "B", the rate of change in air gap 26 as magnet 22 rotates, and the flux lines' 30 strength and direction in relation to sensing device 24 may be configured as a function of each other to yield a substantially linear magnetic response from sensor system 20.

Figure 7:
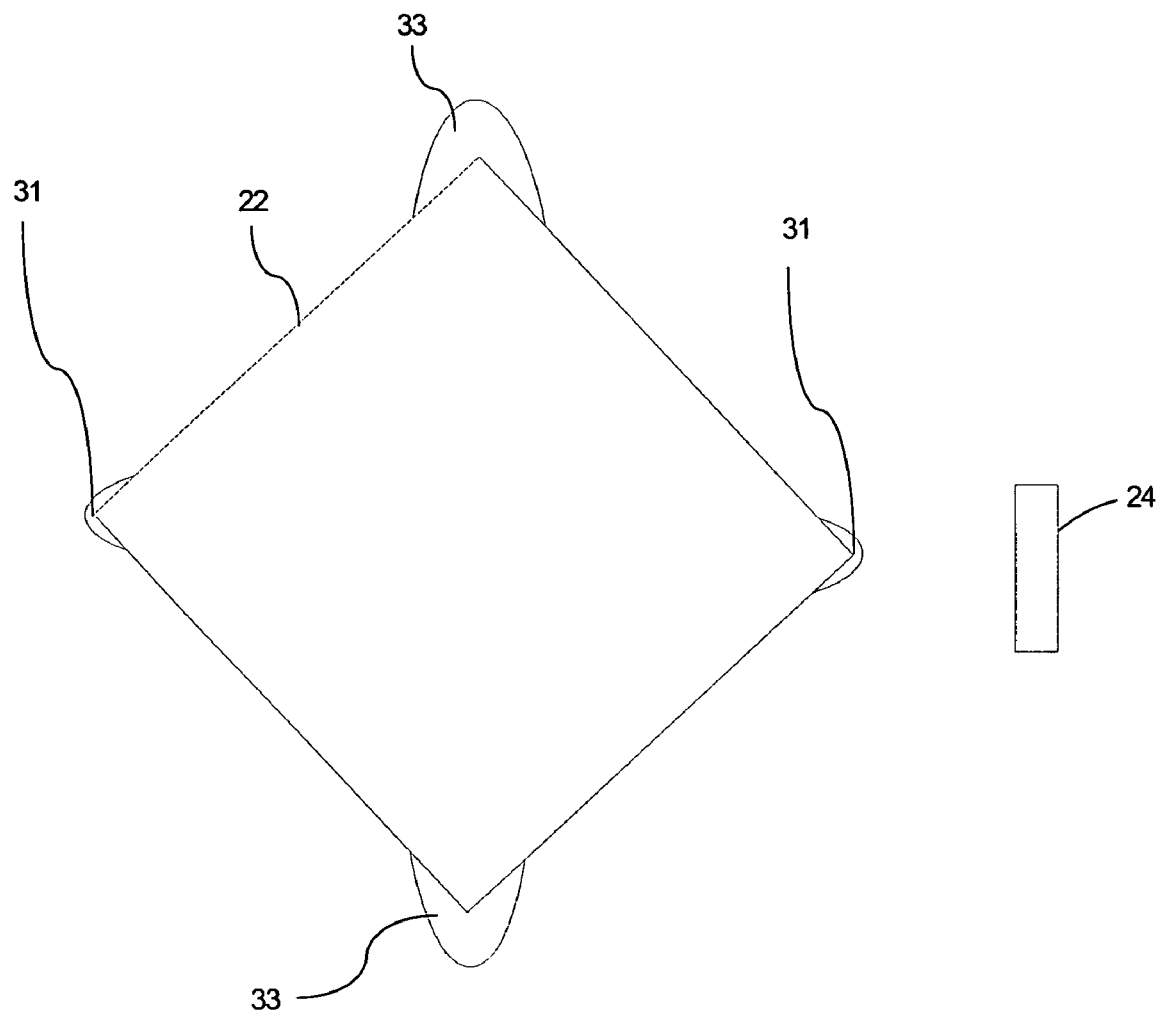
FIG. 7 illustrates exemplary flux density distributions of the magnet of FIG. 6.

It can be further appreciated in view of FIGS. 6 and 7 that the configuration of FIG. 3 yields a magnetic condition of zero flux density and FIG. 4 yields a magnetic condition of maximum flux density, both in absolute value. As will be appreciated by those skilled in the art, the maximum flux density condition could either be a negative or positive value, depending on the direction of magnetization on magnet 22. With reference to FIG. 5, if magnet 22 is rotated clockwise from its position in FIG. 3 (zero flux density condition), the flux condition yielded would be another maximum but with a sign opposite to that of the FIG. 4 condition. Thus, rotation of magnet 22 throughout an angular range of approximately 180 degrees (+/−90° as described above) yields a magnetic flux response that significantly reduces nonlinearity.

As discussed earlier, the design or sensor system 20 parameters such as the values of dimensions "s" and "t", the value or rate of change of air gap 26, magnet 22 strength, material, magnetic flux properties and corner sharpness, for example, may be varied to obtain various degrees of linearity and robustness. Further, in one aspect, the height dimension of magnet 22 may be chosen to ensure that sensing device 24 is exposed to a consistent pattern of flux lines to account for variations in assembly, manufacturing and/or disturbances resulting from use. In this respect, the height of magnet 22 may have an upper and a lower limit whereby a predetermined range or "sweet spot" of the magnet's height is established from which a consistent pattern of flux lines is generated. Sensing device 24 may be positioned with respect to magnet 22 so it is consistently exposed to flux lines generated from the "sweet spot" during use. This upper and lower limit may be established to account for placement of sensing element 24 within sensor system 20 at a point that deviates from design or manufacturing specifications or operational factors. It will be recognized by those skilled in the art that patterns of flux lines emitted from a magnet will vary as a function of the magnet's flux properties and that determining such an upper and lower limit may be a function of those properties as well as the shape of the magnet, air gap 26, angular range of motion and the properties or specifications of the sensing device 24 being used.

The values of design parameters for a particular sensor system 20 may be determined using various techniques, such as by performing computer simulations or conducting laboratory testing. In one aspect of the invention air gap 26 may be sized to be as small as possible taking into account various manufacturing constraints. Minimizing the size of air gap 26 allows for using magnets 22 of relatively less strength, which reduces manufacturing costs. Another aspect of the invention allows for sizing air gap 26 so it changes at a rate when magnet 22 rotates that produces a consistent linear or substantially linear response over a range of angular rotation in view of other sensor system 20 parameters. For example, sizing air gap 26 and determining a rate of change may be a function of a magnet's magnetic flux properties such as the flux density, flux strength and/or flux direction changes observed at the sensing portion of sensing device 24 as magnet 22 rotates. Computer simulations such as finite elements and/or Monte Carlo analysis may be used for sizing air gap 26 as well as physical testing. Variations resulting from manufacture or assembly tolerances that vary outside acceptable limits may be compensated for during calibration at the end of the manufacturing line.

Sensing device 24 may be located in various positions relative to magnet 22 as a function of design or system sensor 20 parameters. FIG. 6 illustrates the sensing element portion 27 of sensing device 24 (not shown in FIG. 6) in five exemplary positions relative to magnet 22. As can be appreciated from FIG. 6, as magnet 22 rotates the angular position of flux lines 30 crossing the sensing element 27 changes, which causes the flux density measured by sensing element 27 to change. When magnet 22 is rotated clockwise with the sensing element 27 of sensing device 24 positioned horizontally, as illustrated in FIG. 6, from the right-most corner of diamond shaped magnet 22, the flux density sensed by sensing element 27 will go from zero (maximum air gap 26 and all flux lines 30 parallel to the face of sensing element 27) to a positive maximum (minimum air gap 26 and all flux lines 30 perpendicular to the face of sensing element 27). Thus, the maximum flux density will have a positive value since the north pole (N) will be closest to the sensing element 27, generating flux line 30 directions that go from a front face to a back face of the sensing element 27.

With respect to known sensing systems having known magnet geometries, such as rectangular, it has been determined that changes in flux density as a sensing element and magnet experience relative movement commonly has a sinusoidal shape. Typically such systems produce a maximum and minimum flux density in less than 90 degrees of angular displacement. One aspect of the present invention allows for varying air gap 26 to improve nonlinearities, which may compensate for changes having a sinusoidal shape. In this respect, the strength of flux lines diminishes as $1/(R^3)$ in free-space where R is the distance, or air gap 26, from the source. Also, flux lines repel each other and seek the path of least reluctance. As illustrated in FIG. 6, flux lines 30 exit magnet 22 through the North pole "N" and complete the circuit on the South pole "S". As they complete this path/circuit their direction changes thereby changing the perpendicular component of the field being sensed by sensing device 24 at every point in space.

Further, with reference to FIGS. 6 and 7, the flux density distribution of a magnet, such as magnet 22 having a diamond shaped cross section, varies as a function of flux lines distance from the magnet as will be appreciated by those skilled in the art. For example and ease of illustration, with respect to a diamond shaped cross section of magnet 22, a relatively stronger flux density distribution is localized in region 31 and a relatively weaker flux density distribution is localized in region 33. Consequently, as magnet 22 turns or rotates, the sensing device 24 senses flux lines of different strength and direction as sensing device 24 transitions from being close to the areas of weaker flux density 33 to those of stronger flux density 31. The combined effect of flux strength, due to the path length of travel, i.e., air gap 26 and north-to-south pole distances, and flux direction with respect to sensing device 24 causes a substantially linear response to be produced from sensor system 20.

It will be appreciated by those skilled in the art that various embodiments of the invention may be used in a wide range of applications. For example, an exemplary embodiment of sensing system 20 shown in FIGS. 2–5 may be used in a vehicle, such as an automobile, for sensing the angular position of various components that rotate. For example, embodiments of sensing system 20 may be used as throttle position sensors, brake pedal sensors, accelerator pedal sensors, lift-gate sensors (mini vans), EGR valve sensors, body height (chassis) sensors, light leveling/aiming sensors or sensors used with link arms for heavy machinery.

Figure 8:
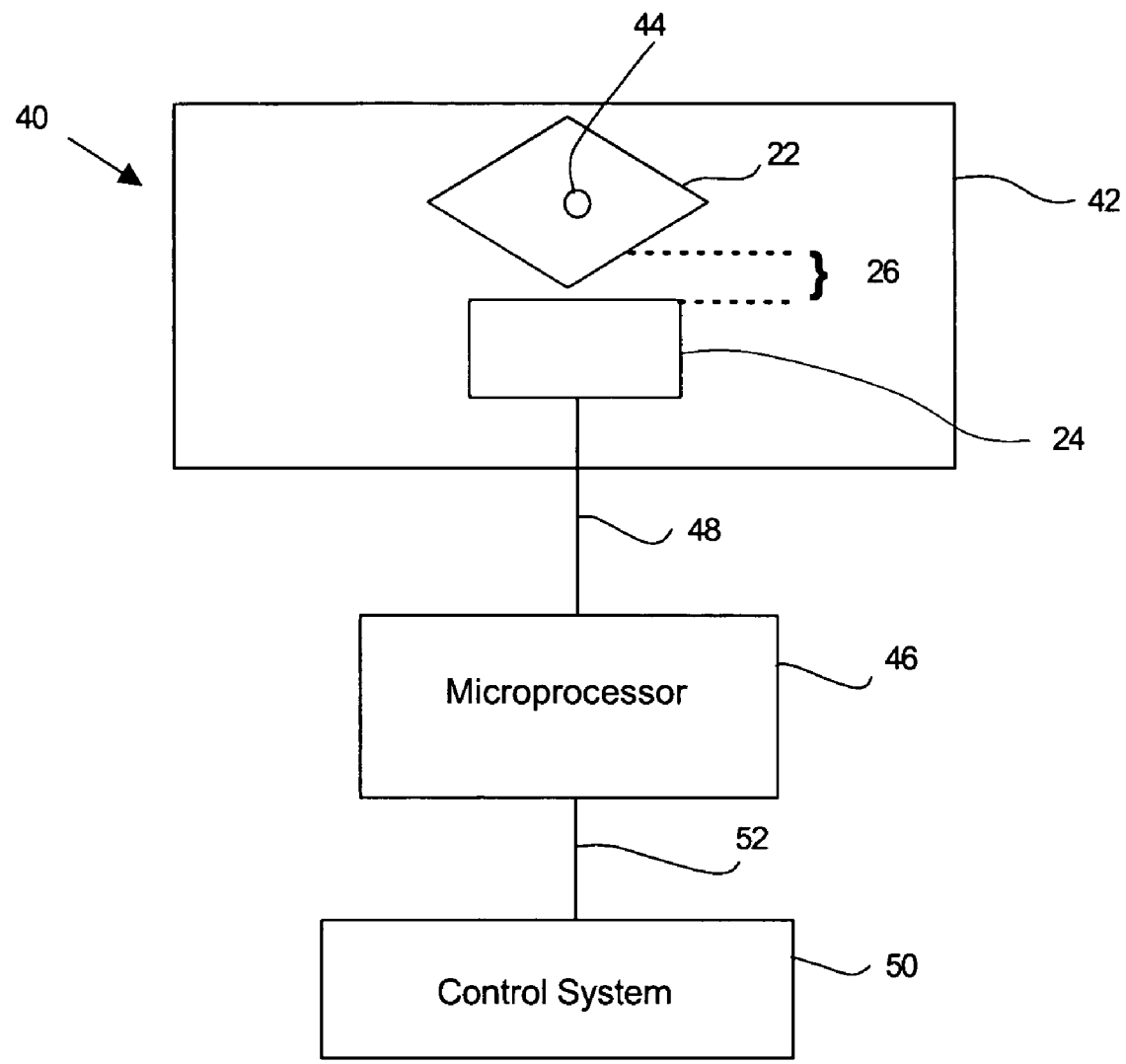
FIG. 8 illustrates a block diagram of an exemplary vehicle system in which an exemplary sensor in accordance with aspects of the invention may be installed.

Referring to FIG. 8, a block diagram representing a vehicle control system is shown and generally designated 40. FIG. 8 illustrates that vehicle control system 40 may include a housing 42 within which magnet 22 may be mounted on a shaft 44 for rotation about an axis. Sensing device 24 may be mounted within housing 42 and spaced from magnet 22 so that air gap 26 is suitably calibrated there between. Sensing device 24 may be electrically connected to a microprocessor 46 or equivalent circuit via an electrical line 48. A control system 50 may be electrically coupled to microprocessor 46 by an electrical line 52. As magnet 22 turns in either rotational direction about shaft 44 sensing device 24 may transmit a signal to microprocessor 46 in response to changes in the magnetic flux. This signal may then be processed by microprocessor 46 to determine a position, such as an angular position, of a component directly or indirectly coupled with shaft 44, for example.

It will be appreciated that various embodiments of the invention may be configured to sense angular motion of one part or component with respect to another part or component without contact there between. Such angular motion or relative angular position may be determined over a predetermined range while providing relatively accurate linear output over the predetermined range.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

What is claimed is:

1. An apparatus for sensing a position of an object, the apparatus comprising:
    a magnet having a set of magnetic flux properties, the magnet mounted for movement about an axis relative to the object; and
    a magnetic field-sensing device mounted in fixed relation to and spaced radially outward from the axis of rotation of the magnet, the magnetic field-sensing device calibrated to sense a change in at least one magnetic flux property in response to movement of the magnet relative to the object and generate a data signal indicative of a position of the object, wherein the magnetic field-sensing device is spaced from the magnet to define an air gap there between that changes at a predetermined rate in response to movement of the magnet relative to the object, and wherein the magnet is configured to have a substantially diamond shaped cross section having a longer diagonal dimension and a shorter diagonal dimension and having a north pole centered at a vertex of the longer diagonal dimension of the diamond shape and a south pole centered at an opposite vertex, and the magnetic field-sensing device is calibrated to sense a change in flux density distribution in response to a change in the air gap.

2. The apparatus of claim 1 wherein the change in flux density distribution is substantially linear.

3. A sensor system comprising:
    a housing;
    a magnet having a set of magnetic flux properties and an exterior surface, wherein said magnet is configured to have a substantially diamond shaped cross section having a longer diagonal dimension and a shorter diagonal dimension and having a north pole centered at a vertex of the longer diagonal dimension of the diamond shape and a south pole centered at an opposite vertex;
    a shaft rotatably coupled with the housing, the magnet connected to the shaft so that the magnet rotates about an axis in response to an angular displacement of an object; and
    a magnetic field-sensing device coupled with the housing and spaced from the magnet so that an air gap is defined between the exterior surface of the magnet and the magnetic field-sensing device and changes at a rate in response to rotation of the magnet so that a flux density level sensed by the magnetic field-sensing device changes at a substantially linear rate.

4. The sensor system of claim 3 wherein a shape of the exterior surface of the magnet and a distance defined by the air gap are determined based on a magnetic field component that is perpendicular to a sensing surface of the magnetic field-sensing device.

5. The sensor system of claim 3 wherein a shape of the exterior surface of the magnet and a distance defined by the air gap are determined based on a flux line strength of the magnet.

6. The sensor system of claim 3 further comprising:
    a microprocessor configured to receive a data signal transmitted from the magnetic field-sensing device in response to rotation of the magnet and to determine a position of an object based on the transmitted data signal; and
    a control system configured to receive a data signal from the microprocessor indicative of the position of the object and display data indicative of the position.

7. A method of detecting an angular position of an object, the method comprising:
    providing a magnet having a set of magnetic flux properties and an exterior surface, wherein said magnet is configured to have a substantially diamond shaped cross section having a longer diagonal dimension and a shorter diagonal dimension and having a north pole centered at a vertex of the longer diagonal dimension of the diamond shape and a south pole centered at an opposite vertex;
    providing a magnetic field-sensing device calibrated with respect to the set of magnetic flux properties to sense a flux density distribution;
    mounting the magnet for rotation about an axis;
    positioning the magnetic field-sensing device in fixed relation to the magnet so that the magnetic field-sensing device senses a first minimum flux density distribution when the magnet is in a first position and a second minimum flux density distribution when the magnet is in a second position; and
    spacing the magnetic field-sensing device from the exterior surface of the magnet so that an air gap is defined there between that changes at a rate in response to rotation of the magnet so that a flux density distribution sensed by the magnetic field-sensing device changes at a substantially linear rate.

8. The method of claim 7 wherein the magnet is mounted to rotate approximately 180 degrees between the first position and the second position.

* * * * *